(12) United States Patent
Crary et al.

(10) Patent No.: US 9,795,907 B2
(45) Date of Patent: Oct. 24, 2017

(54) ADAPTER ASSEMBLY FOR SECURING A PRECLEANER TO AN AIR FILTRATION SYSTEM

(71) Applicant: DRM Industries Corp., Wisconsin Dells, WI (US)

(72) Inventors: Theodore R. Crary, Baraboo, WI (US); Randy D. Winchel, Reedsburg, WI (US)

(73) Assignee: DRM DIVERSAFAB CORP., Baraboo, WI (US)

( * ) Notice: Subject to any disclaimer, the term of this patent is extended or adjusted under 35 U.S.C. 154(b) by 115 days.

(21) Appl. No.: 14/556,614

(22) Filed: Dec. 1, 2014

(65) Prior Publication Data

US 2016/0151731 A1    Jun. 2, 2016

(51) Int. Cl.
   *B01D 46/00* (2006.01)
   *F02M 35/04* (2006.01)
   *B01D 50/00* (2006.01)
   *F02M 35/02* (2006.01)

(52) U.S. Cl.
   CPC ....... *B01D 46/0005* (2013.01); *B01D 50/002* (2013.01); *F02M 35/0216* (2013.01)

(58) Field of Classification Search
   CPC ............ B01D 2265/06; B01D 46/0005; B01D 2265/028; B01D 46/0004; B01D 46/10; B01D 2271/02; B01D 46/0019; B01D 46/2411; B01D 2265/027; F02M 35/02; F02M 35/0216; F02M 35/10118; F02M 35/04; F02M 35/086; F02M 35/16

USPC .......... 123/198 E, 184.21; 55/357, 498, 502, 55/497, 337, 383, 520, 385.3, 419, 495
   See application file for complete search history.

(56) References Cited

U.S. PATENT DOCUMENTS

| | | | | |
|---|---|---|---|---|
| 4,248,613 A | * | 2/1981 | Linhart | B01D 45/12 55/337 |
| 4,394,145 A | | 7/1983 | Sundseth | |
| 5,059,222 A | | 10/1991 | Smith | |
| 5,935,281 A | * | 8/1999 | Rotheise | B01D 46/2411 55/385.3 |
| 6,361,574 B1 | * | 3/2002 | Decker | B01D 45/14 55/317 |
| 6,395,048 B1 | * | 5/2002 | Yoder | B01D 46/0041 123/198 E |
| 6,638,331 B2 | | 10/2003 | Hettmann | |
| D497,619 S | | 10/2004 | Reitsma | |

(Continued)

*Primary Examiner* — Long T Tran
(74) *Attorney, Agent, or Firm* — Charles S. Sara; DeWitt Ross & Stevens S.C.

(57) ABSTRACT

An adapter assembly includes an adapter body extending from an adapter inlet to an adapter outlet, a canister mount for securing the adapter body to an air filter canister, and an adapter joint for securing the adapter body to the canister mount. The canister mount includes a collar that is secured about the air filter canister. The adapter joint allows the adapter body to be moved away from the air filter canister for air filter replacement without having to disconnect the adapter body from the air filter canister. Precleaners are airtightly securable to the adapter body inlet, and the air filter canister is airtightly securable to the adapter body outlet. Air cleaned by the precleaners before reaching the air filter has less contamination to be filtered by the air filter before the air flows into an engine. Precleaning significantly extends the life of air filters.

20 Claims, 4 Drawing Sheets

(56) References Cited

U.S. PATENT DOCUMENTS

| | | |
|---|---|---|
| 6,991,664 B2 | 1/2006 | Riehmann et al. |
| 7,682,413 B2 | 3/2010 | Sheidler |
| 7,799,106 B2 | 9/2010 | Rother et al. |
| 8,419,834 B2 * | 4/2013 | Rotter ................ B01D 46/0004 123/198 E |
| 8,617,279 B2 | 12/2013 | Schlesinger et al. |
| 9,295,936 B2 * | 3/2016 | Krisko ................... B01D 45/12 |
| 2008/0190082 A1 * | 8/2008 | Scott ................... B01D 46/0005 55/520 |
| 2009/0151308 A1 | 6/2009 | Jung |
| 2009/0229685 A1 * | 9/2009 | Hageman ............... B60K 13/02 137/544 |
| 2010/0071978 A1 * | 3/2010 | Kisse ................... F02M 35/022 180/68.2 |
| 2012/0272633 A1 * | 11/2012 | Scott ................. B01D 46/0005 55/497 |
| 2013/0019576 A1 * | 1/2013 | Krisko ................... B01D 45/16 55/357 |
| 2014/0260129 A1 * | 9/2014 | Rosenfeld .......... F02M 35/0215 55/385.1 |
| 2014/0325947 A1 * | 11/2014 | Krisko ................... B01D 45/12 55/498 |
| 2014/0360144 A1 * | 12/2014 | Coulonvaux ...... B01D 46/0023 55/357 |

* cited by examiner

ADAPTER ASSEMBLY FOR SECURING A PRECLEANER TO AN AIR FILTRATION SYSTEM

FIELD OF THE INVENTION

This document concerns an invention relating generally to adapter assemblies for securing one or more precleaners to an air filtration system for air flowing into (for example) an engine.

BACKGROUND OF THE INVENTION

The introduction of clean air is necessary for the efficient operation of an internal combustion engine. An internal combustion engine receives air and fuel and burns them in a combustion chamber in order to produce mechanical power. Efficient engine combustion is based on the proper mass flow ratio of fuel and air. Air intake pipes, or stacks, are generally located on the outside of the engine for carrying outside air into the combustion chamber of the engine.

Prior to the introduction of air into the engine, it is desirable to remove as many contaminants or particulates from the air as possible. Undesirable contaminants include particulate matter such as dirt, dust, sand, and the like. Introducing air containing dust and debris is a major source of engine wear. The piston and the cylinder barrel are particularly subject to wear in this type of engine, although any moving engine part is susceptible to accelerated wear when contaminants are contained in the inlet air.

In order to reduce this wear, air filters are necessary to clean the drawn in combustion air and filter out as many contaminants contained in the intake air as possible before the particles reach the internal combustion engine. In practice, however, these filters are often inadequate as they possess limited contaminant filtration capacity and require frequent replacement.

Thus, precleaners are often utilized to extend the air filter service period and increase engine combustion efficiency. Precleaners are generally located on the open inlet side of the air intake pipes or stacks. The function of the precleaner is to remove as many contaminants from the air as possible before the air flows into the air filter.

The precleaner imparts a swirl to the air, centrifuging out a major percentage of contaminants which may be collected in a reservoir or exhausted out on either a continuous or intermittent basis. All precleaners operate on the principle of centrifugal separation. Outside air, with its entrained contaminants, enters the precleaner from the vacuum created by the engine. The air and contaminants traverse a set of fixed static vanes, which cause the air to circulate at a great speed. The centrifugal force throws contaminants and moisture to the outer wall of the precleaner. The contaminants follow the wall until they reach an area where they are discharged back into the atmosphere or collected. Clean, dry air then enters the filter elements.

Engine air precleaners are particularly advantageous in that they extend filter life, improve fuel economy and prolong engine life. If the internal combustion engine is used in an environment where the ambient air contains large amounts of dust, dirt or other contaminants, an efficient air precleaning and filter arrangement is necessary.

SUMMARY OF THE INVENTION

The invention, which is defined by the claims set forth at the end of this document, is directed to precleaner adapter kits which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIGS. 1A, 1B, 2, and 3, an exemplary adapter assembly 100 includes an adapter body 110, a canister mount 120 for securing the adapter body 110 to an air filter canister 10, and an adapter joint 130 for securing the adapter body 110 to the canister mount 120. The adapter body 110 extends from an adapter inlet 140 to an adapter outlet 150. The adapter inlet 140 is complementarily interfittable with extender outlets 160, which are securable to first and second precleaners 170 such that the adapter body 110 is airtightly securable to the precleaners 170. The adapter outlet 150 is complementarily interfittable with the air filter canister 10 such that the adapter body 110 is airtightly securable to the air filter canister 10. The precleaners 170 are installed on the adapter body 110 via extenders 270 by securing precleaner outlets 175 to extender inlets 155 and securing the extender outlets 160 to the adapter inlets 140. The adapter body 110 is secured to the air filter canister 10 using the canister mount 120 so that air flowing into the air filter canister 10 has first passed through the precleaners 170. When the adapter body 110 is airtightly secured to the precleaners 170 and the air filter canister 10, air flows into precleaner inlets 180 for cleaning by the precleaners 170, out the precleaner outlets 175 and into the extender inlets 155, out the extender outlets 160 and into the adapter inlet 140, out the adapter outlet 150 and into the canister inlet 15 for filtering by an air filter 25 in the air filter canister 10, and out a canister outlet 20 for use by (for example) an engine. Precleaning of the air entering an air filter 25 significantly extends the life of the air filter 25. Further advantages and features of the invention will be apparent from the remainder of this document in conjunction with the associated drawings.

DETAILED DESCRIPTION OF PREFERRED VERSIONS OF THE INVENTION

Figure 1A:
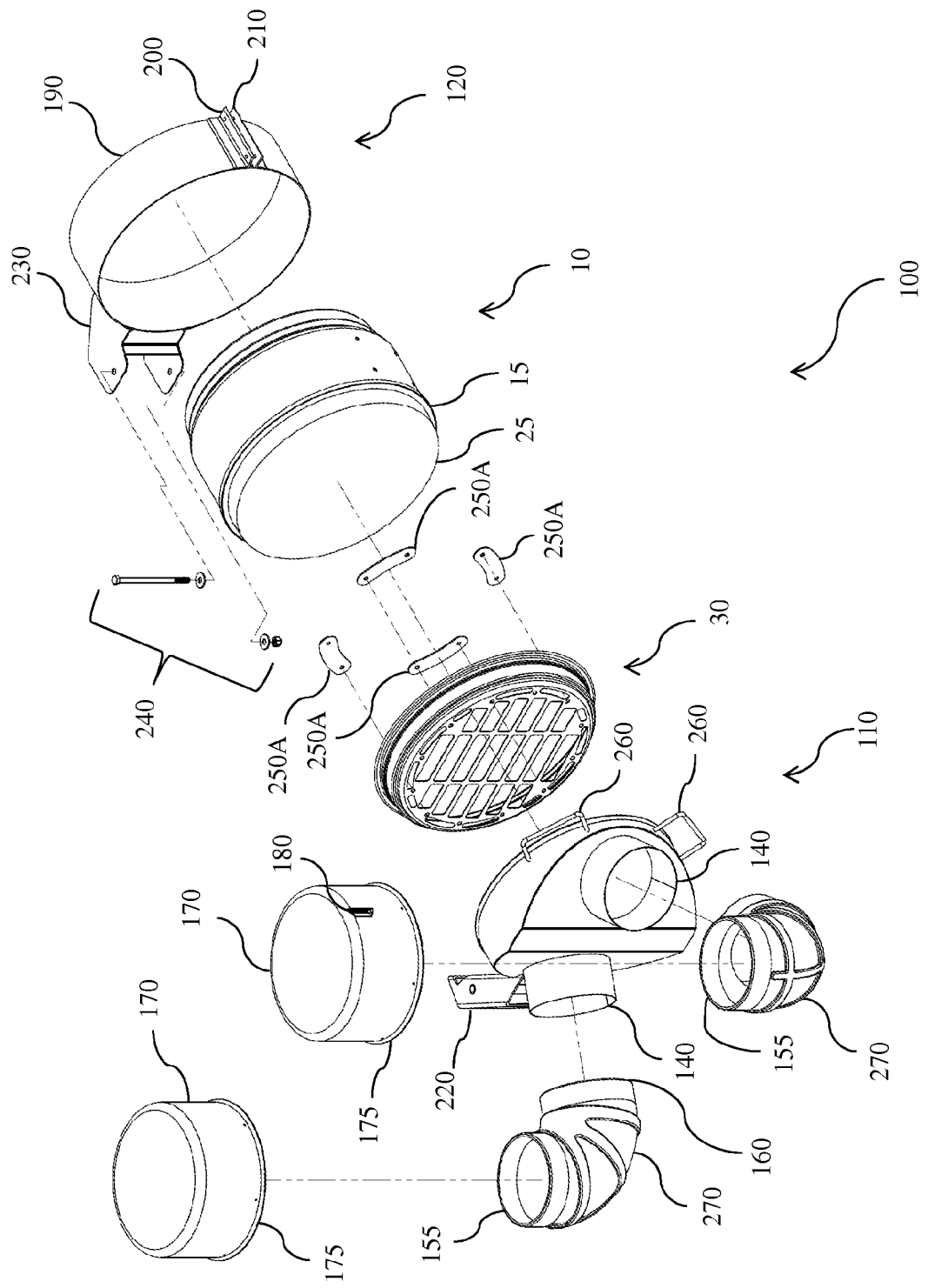
FIG. 1A is an exploded view of an exemplary adapter assembly 100 with first and second precleaners 170 and an air filter canister 10.
Figure 1B:
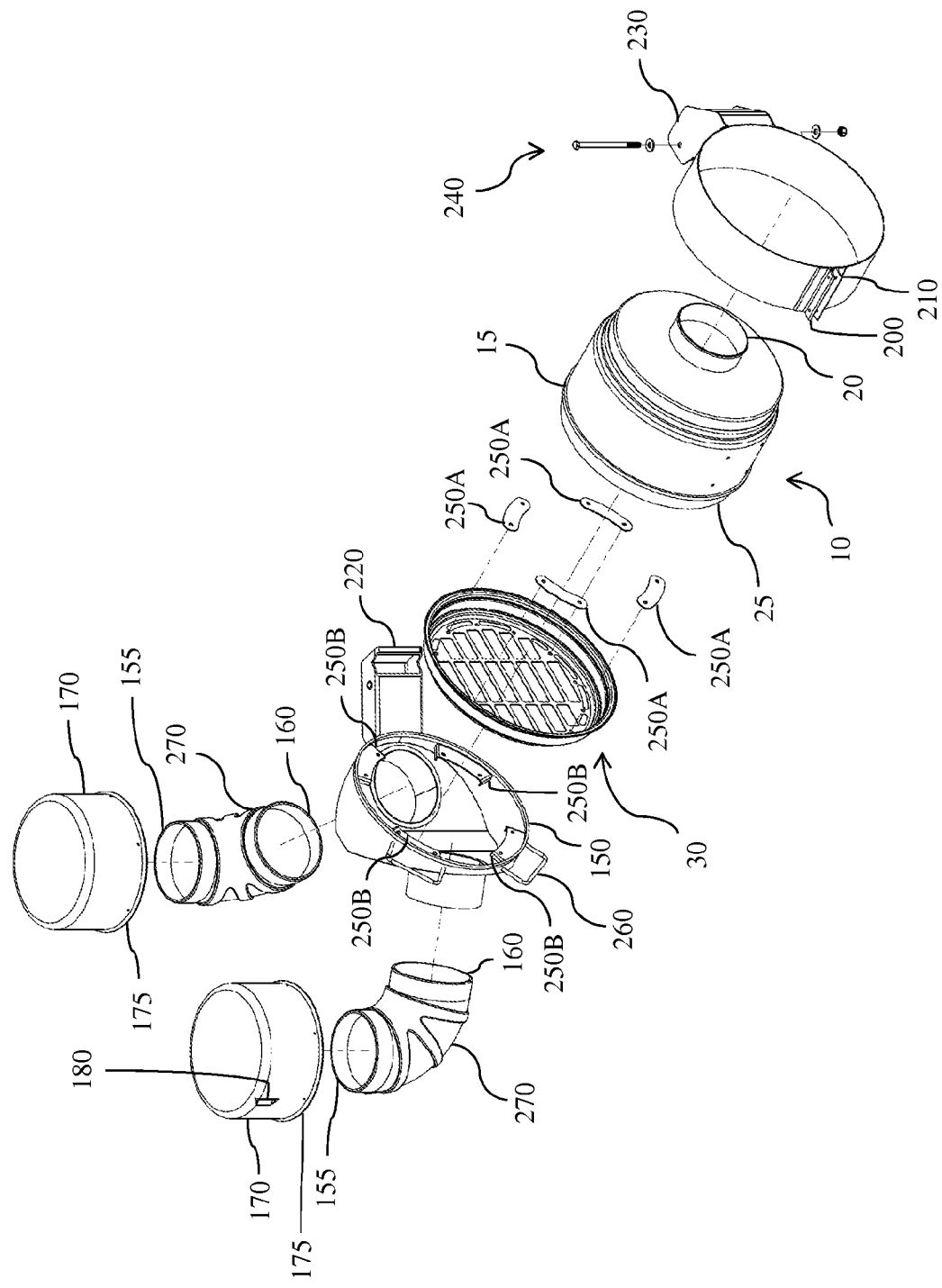
FIG. 1B is an alternative view of the components in FIG. 1A.

Continuing the discussion in the above Summary of the Invention section, the canister mount 120 includes a collar 190 that fits about the air filter canister 10. The collar 190 circumferentially extends from a collar first end 200 to a collar second end 210, the collar first and second ends 200, 210 being connectable to each other using fasteners to secure the collar 190 about the air filter canister 10. The adapter joint 130 includes a body connector 220 extending from the adapter body 110, and a mount connector 230 extending from the canister mount 120. The mount connector 230 extends from the collar 190 at a point between the collar first and second ends 200, 210, and in the version shown in the drawings is positioned about midway between the collar first and second ends 200, 210. The body connector 220 is pivotably securable to the mount connector 230 using a mount fastener 240.

Figure 2:
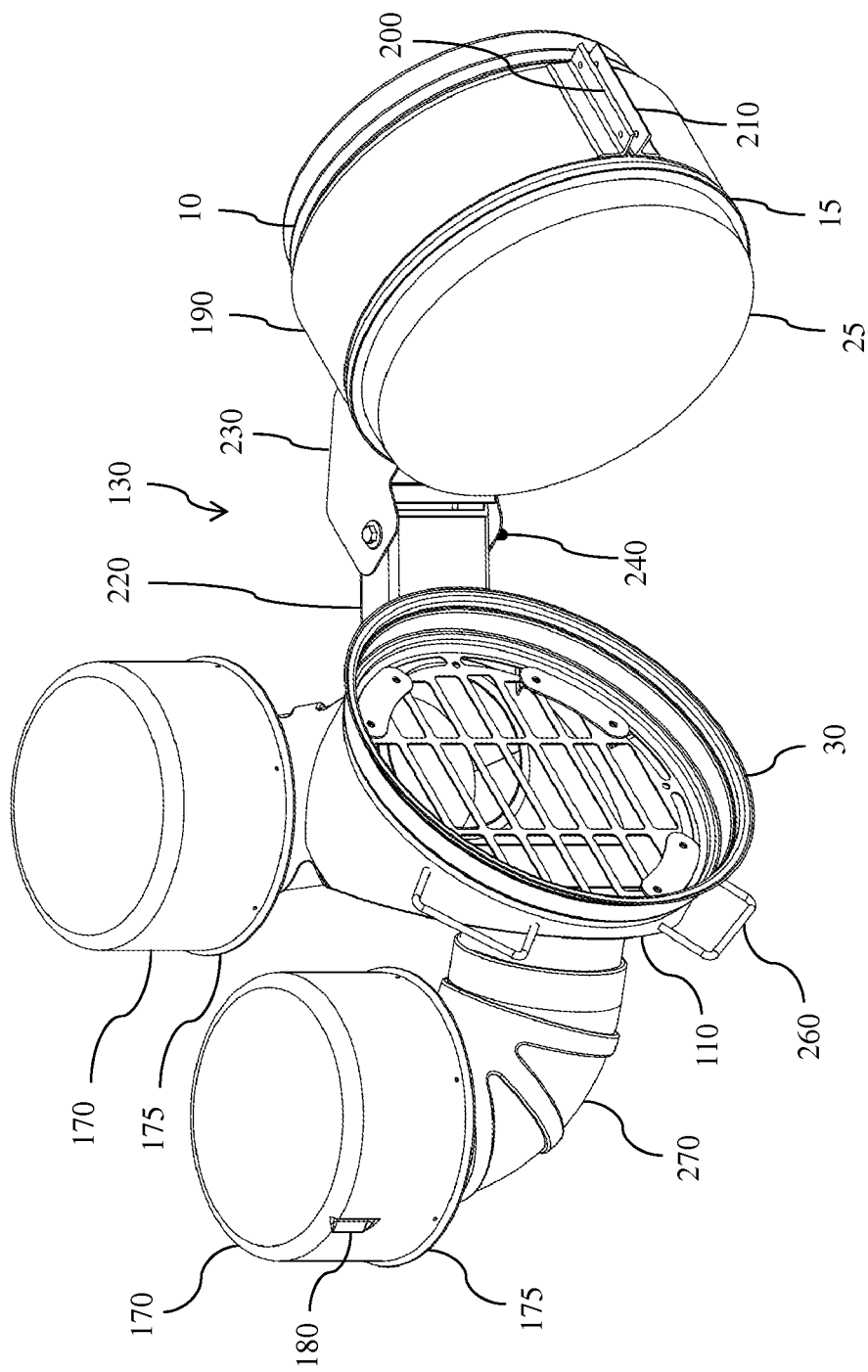
FIG. 2 shows the adapter assembly 100 of FIGS. 1A and 1B assembled with the first and second precleaners 170 and the air filter canister 10.
Figure 3:
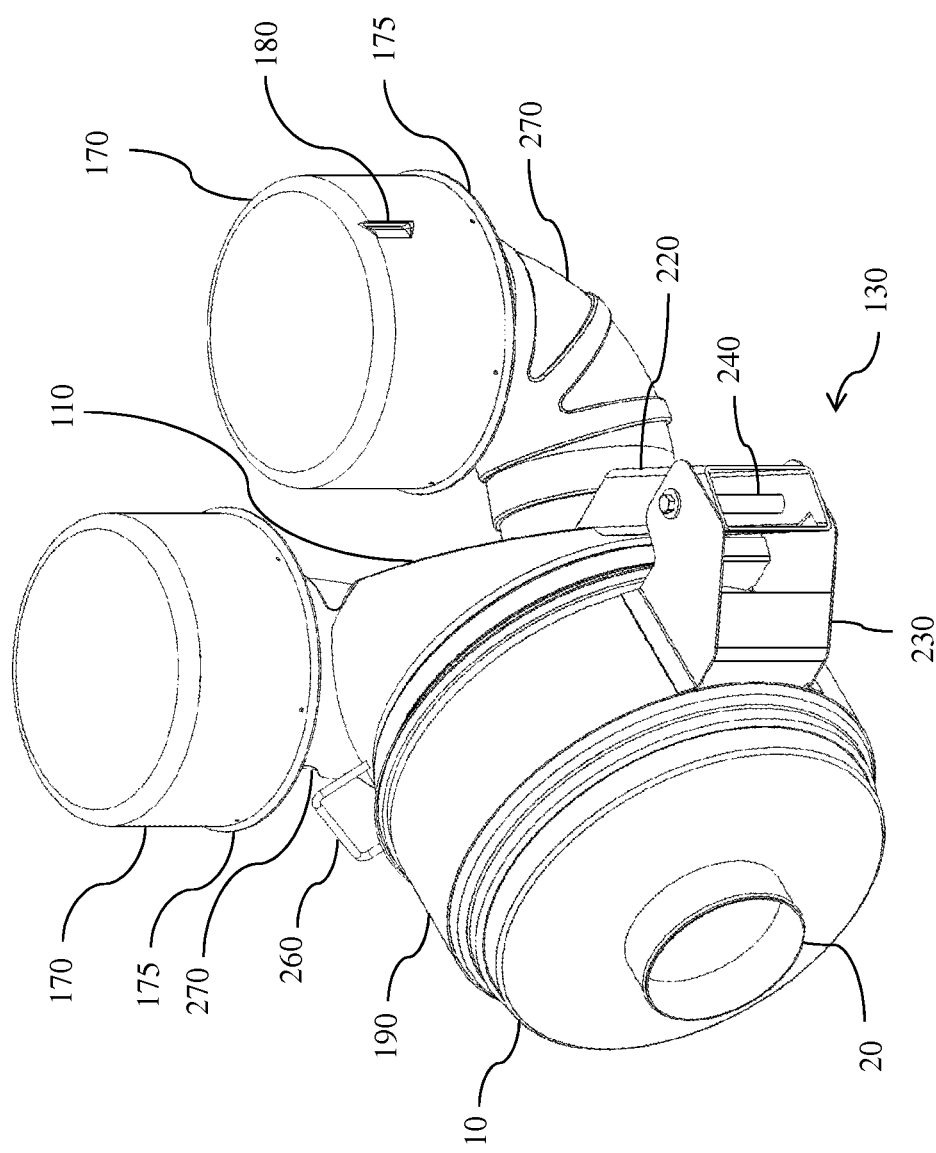
FIG. 3 shows the assembly of FIG. 2 with the adapter body 110 and canister lid 30 in a closed position.

The air filter canister 10 extends from the canister inlet 15 to the canister outlet 20, and includes a removable canister lid 30 secured to the canister inlet 15. The adapter body 110 preferably includes pairs of lid connectors 250A, 250B (four pairs shown in drawings) that sandwich a canister lid 30 of the air filter canister 10 to secure the canister lid 30 to the adapter body 110, allowing the user to handle the adapter body 110 and canister lid 30 together as a unit rather than separately when removing and replacing the canister lid 30 to access the air filter 25. The adapter outlet 150 of the adapter body 110 is airtightly interfittable with an exterior of the canister lid 30. The canister lid 30 is also airtightly interfittable with a canister inlet 15 of the air filter canister 10. The adapter body 110 preferably includes body handles 260 to allow the user to more easily grasp the adapter body 110 when removing or replacing the adapter body 110 from the air filter canister 10. When the air filter 25 in the air filter canister 10 is to be replaced, a user is able to grab the body handles 260 and disengage the adapter body 110 (with canister lid 30 secured thereto) from the air filter canister 10. The canister mount 120 helps keep the adapter body 110 secured to the air filter canister 10 even when the adapter body 110 is pivoted or otherwise moved away from the air canister inlet 15 in order to access the air filter 25 being replaced. The adapter body 110 thus does not need to be placed aside or on the floor but rather can stay in close proximity to the air filter canister 10 when detached from the air filter canister 10 (see "open" position of FIG. 2) until it is to be reattached to the air filter canister 10 (see "closed" position of FIG. 3).

The adapter body 110 includes adapter inlets 140 for receiving precleaners 170 via outputs (such as precleaner outlets 175 or extender outlets 160). That is, precleaners 170 may be directly secured to the adapter inlets 140 via precleaner outlets 175 as outputs, or they may optionally be secured to the adapter inlets 140 via extenders 270 with extender outlets 160 as outputs. In the version shown in the drawings, the first and second adapter inlets 140 interfit with extender outlets 160 of first and second extenders 270, and extender inlets 155 interfit with precleaner outlets 175 of first and second precleaners 170, with the adapter body 110 airtightly securable to both the first and second precleaners 170 simultaneously. The adapter inlet 140 in the drawings includes two cylindrical necks extending out from the adapter body 110, with each neck airtightly interfittable with one of the extenders 270 secured to the precleaners 170.

An exemplary method of using the above adapter assembly 100 is useful in securing one or more precleaners 170 to an air filter canister 10 to preclean air flowing to an air filter 25 before filtered air reaches an engine. The precleaners 170 can be airtightly secured to an air filter canister 10 by installing each precleaner 170 on the adapter body 110 by airtightly securing an extender outlet 160 to the adapter inlet 140. The canister mount 120 can be used to secure the adapter body 110 to the air filter canister 10 such that air flowing into the air filter canister 10 has already passed through one or more precleaners 170. Before the adapter body 110 is mounted to the air filter canister 10, the user may remove a canister lid 30 from the air filter canister 10 (if not already removed), and secure the canister lid 30 to the adapter outlet 150 of the adapter body 110 using lid connectors 250A, 250B. To replace an air filter 25 in the air filter canister 10, the user may disengage the adapter body 110 from the air filter canister 10 and pivot the adapter body 110 relative to the canister inlet 15 such that an air filter 25 in the air filter canister 10 is exposed. The canister mount 120 helps keep the adapter body 110 secured to the air filter canister 10 while the air filter 25 is being replaced. Once the new air filter 25 has been inserted, the combination adapter body 110 and canister lid 30 may again be airtightly secured to the air filter canister 10. The user may also secure the air filter canister 10 to an engine (if not already secured thereto) such that the canister outlet 20 feeds into an air intake of the engine.

Various preferred versions of the invention are shown and described above to illustrate different possible features of the invention and the varying ways in which these features may be combined. Apart from combining the different features of the foregoing versions in varying ways, other modifications are also considered to be within the scope of the invention. For example, the adapter body 110 may be secured to the air filter canister 10 via an adapter joint 130 without a canister mount 120, such as by having the mount connector 230 extend from the air filter canister rather than canister mount 120. Alternatively, the canister mount 120 and adapter joint 130 may be eliminated, such that the adapter body 110 is attached to and detached from the canister inlet 15 without also being secured to the air filter 10 via the canister mount 120 and adapter joint 130. Moreover, the precleaners 170 may be secured directly to the adapter inlet 140 of the adapter body 110 without using extenders 270.

It must be kept in mind that the assembly shown in the accompanying drawings and discussed above are merely exemplary, and may assume a wide variety of configurations and dimensions different from those noted, and may use components different from those noted. It should also be understood that terms referring to orientation and position are relative terms rather than absolute ones; thus, such terms should be regarded as words of convenience, rather than limiting terms. Further, the invention is not intended to be limited to these versions. Rather, the scope of rights to the invention is limited only by the claims set out below, and the invention encompasses all different versions that fall literally or equivalently within the scope of these claims.

What is claimed is:

1. An adapter assembly for securing at least one precleaner to an air filter canister to preclean air flowing to an air filter before filtered air reaches an engine, a. the adapter assembly including: i. an adapter body having at least a portion extending from an adapter inlet to an adapter outlet, 1) the adapter inlet being complementarily interfittable with an output from the at least one precleaner such that the adapter body is airtightly securable to the precleaner, 2) the adapter outlet being complementarily interfittable with the air filter canister such that the adapter body is airtightly securable to the air filter canister; and ii. a canister mount for securing the adapter body to the air filter canister; b. wherein the at least one precleaner is airtightly securable to the air filter canister via the adapter assembly by: i. installing the at least one precleaner on the adapter body by airtightly securing an output from the at least one precleaner to the adapter inlet; and ii. using the canister mount to secure the adapter body to the air filter canister such that air flowing into the air filter canister has already passed through the precleaner.

2. The assembly of claim 1 wherein:
   a. the canister mount includes a collar that is fittable about the air filter canister; and b. the adapter body is securable to the air filter canister via the canister mount.

3. The assembly of claim 2 wherein the collar extends from a collar first end to a collar second end, the collar first and second ends being connectable to each other to secure the collar about the air filter canister.

4. The assembly of claim 1 further including an adapter joint for securing the adapter body to the canister mount, wherein the adapter joint includes:
   a. a body connector extending from the adapter body; and
   b. a mount connector extending from the canister mount, the mount connector being pivotably securable to the body connector.

5. The assembly of claim 4 wherein:
   a. the canister mount includes a collar that is fittable about the air filter canister to secure the adapter body to the air filter canister, the collar extending from a collar first end to a collar second end; and
   b. the mount connector extends from the collar at least substantially midway between the collar first and second ends.

6. The adapter assembly of claim 1 wherein the adapter outlet is complementarily interfittable with a canister lid of the air filter canister such that when the adapter outlet is secured to the canister lid, the adapter body is airtightly securable to the air filter canister.

7. The adapter assembly of claim 6 wherein the adapter body further includes a lid connector for securing a canister lid of the air filter canister to the adapter body such that the adapter outlet is complementarily interfit with an exterior of the canister lid.

8. The adapter assembly of claim 1 further including a canister lid removably secured to the adapter outlet, wherein the canister lid is complementarily interfittable with:
   a. the adapter outlet; and
   b. a canister inlet of the air filter canister.

9. The adapter assembly of claim 1 wherein when the adapter body is secured between the precleaner and the air filter canister, air flows:
   a. into a precleaner inlet for precleaning by the precleaner;
   b. out the output from the precleaner and into the adapter inlet; and
   c. out the adapter outlet and into the canister inlet for filtering by the air filter in the air filter canister.

10. The adapter assembly of claim 1 wherein when the adapter body is secured to the air filter canister via the canister mount, the adapter body is pivotally movable with respect to the air filter canister to repeatably provide a user access to a replaceable air filter in the air filter canister.

11. The adapter assembly of claim 1 wherein the adapter body includes a first adapter inlet and a second adapter inlet for receiving two precleaners, the first and second adapter inlets being complementarily interfittable with first and second precleaner inlets of first and second precleaners, respectively, such that the adapter body is simultaneously airtightly securable to both the first and second precleaners.

12. The adapter assembly of claim 1 further including the at least one precleaner secured to the adapter inlet, wherein the adapter inlet includes an at least substantially cylindrical neck extending outwardly from the adapter body, the neck being airtightly interfittable with the at least one precleaner.

13. The adapter assembly of claim 1 further including the air filter canister securable to the engine to filter air entering the engine, the air filter canister:
   a. extending from a canister inlet to a canister outlet; and
   b. having a removable canister lid secured to the canister inlet.

14. A method of using an adapter assembly to secure a precleaner to an air filter canister to preclean air flowing to an air filter before filtered air reaches an engine, a. the adapter assembly including: i. an adapter body having at least a portion extending from an adapter inlet to an adapter outlet, 1) the adapter inlet being complementarily interfittable with an output from a precleaner such that the adapter body is airtightly securable to the precleaner, 2) the adapter outlet being complementarily interfittable with the air filter canister such that the adapter body is airtightly securable to the air filter canister; and ii. a canister mount for securing the adapter body to the air filter canister; b. wherein the method includes the step of airtightly securing the precleaner to the air filter canister via the adapter assembly by: i. installing the precleaner on the adapter body by airtightly securing an output from the precleaner to the adapter inlet; and ii. using the canister mount to secure the adapter body to the air filter canister such that air flowing into the air filter canister has already passed through the precleaner.

15. The method of claim 14 further including the steps of, before the adapter body is mounted to the air filter canister:
   a. removing a canister lid from the air filter canister; and
   b. securing the canister lid to the adapter outlet of the adapter body.

16. The method of claim 14 further including the steps of:
   a. while the adapter body remains secured to the air filter canister via the canister mount, disengaging the adapter body from the air filter canister and pivoting the adapter body relative to the canister inlet such that the air filter in the air filter canister is exposed;
   b. replacing a used air filter in the air filter canister with a new air filter; and
   c. airtightly securing the adapter body to the air filter canister.

17. An adapter assembly for securing a precleaner to an air filter canister to preclean air flowing to an air filter before filtered air reaches an engine, a. the adapter assembly including: i. the air filter canister securable to an engine to filter air entering the engine, the air filter canister: 1) extending from a canister inlet to a canister outlet; and 2) having a removable canister lid secured to the canister inlet; ii. a precleaner extending from a precleaner inlet to a precleaner outlet; iii. an adapter body having at least a portion extending from an adapter inlet to an adapter outlet, 1) the adapter inlet being complementarily interfittable with an output from the precleaner such that the adapter body is airtightly securable to the precleaner, 2) the adapter outlet being complementarily interfittable with the canister inlet such that the adapter body is airtightly securable to the air filter canister; b. wherein when the adapter body is airtightly secured to the precleaner and the air filter canister, air flows: i. into the precleaner inlet for cleaning by the precleaner and out the precleaner outlet; ii. into the adapter inlet and out the adapter outlet; and iii. into the canister inlet for filtering by an air filter in the air filter canister and out the canister outlet.

18. The adapter assembly of claim 17 wherein the air filter canister further includes a canister mount for securing the adapter body to the air filter canister, the canister mount having a collar extending from a collar first end to a collar second end, wherein the collar is securable to the air filter canister by connecting the collar first end to the collar second end while the collar is fit about the air filter canister.

19. The adapter assembly of claim 18 further including an adapter joint for securing the adapter body to the canister mount,
   a. the adapter joint having:
      i. a body connector extending from the adapter body; and
      ii. a mount connector extending from the canister mount, the mount connector being pivotably securable to the body connector;
   b. wherein when the adapter body is secured to the air filter canister via the adapter joint and canister mount, the adapter body is movable with respect to the air filter canister to repeatably provide a user access to a replaceable air filter in the air filter canister.

20. The adapter assembly of claim 19 further including an extender having an extender inlet and an extender outlet, wherein the adapter inlet includes an at least substantially cylindrical neck extending from the adapter body, the neck being airtightly interfittable with the extender outlet.

\* \* \* \* \*